(12) United States Patent
Heller et al.

(10) Patent No.: US 6,886,055 B2
(45) Date of Patent: Apr. 26, 2005

(54) COMPUTER ON A CARD WITH A REMOTE HUMAN INTERFACE

(75) Inventors: Andrew Heller, Austin, TX (US); Barry Thornton, Austin, TX (US)

(73) Assignee: ClearCube Technology, Inc., Austin, TX (US)

( * ) Notice: Subject to any disclaimer, the term of this patent is extended or adjusted under 35 U.S.C. 154(b) by 480 days.

(21) Appl. No.: 09/728,667

(22) Filed: Dec. 1, 2000

(65) Prior Publication Data

US 2001/0000539 A1 Apr. 26, 2001

Related U.S. Application Data

(63) Continuation-in-part of application No. 09/524,812, filed on Mar. 14, 2000, which is a continuation of application No. 09/072,320, filed on May 4, 1998, now Pat. No. 6,038,616.
(60) Provisional application No. 60/069,464, filed on Dec. 15, 1997.

(51) Int. Cl.[7] .............................................. G06F 13/12
(52) U.S. Cl. ........................... 710/62; 710/65; 710/301; 710/302; 709/217; 709/218
(58) Field of Search .................. 710/36–47, 62–74, 710/300–304; 709/217–219

(56) References Cited

U.S. PATENT DOCUMENTS

| | | | |
|---|---|---|---|
| 3,725,866 A | 4/1973 | Oldfield et al. | |
| 4,484,306 A | 11/1984 | Kulczyckyj et al. | |
| 5,130,793 A | 7/1992 | Bordry et al. | |

(Continued)

FOREIGN PATENT DOCUMENTS

| | | |
|---|---|---|
| KR | 2001106740 A | 12/2001 |
| WO | WO 95/00917 | 1/1995 |
| WO | WO 99/18533 | 4/1999 |
| WO | WO 00/28518 | 5/2000 |
| WO | WO 01/13637 | 2/2001 |
| WO | WO 2004/010281 | 1/2004 |

OTHER PUBLICATIONS

Meece, Mickey, "Plastic to Be Aboard When Gaming Takes Flight," American Banker, Jan. 7, 1994, vol. 159, No. 5, p. 14.
Hartley, Patrick H., "Cut Costs With Computing," School Planning and Management, May 2001, vol. 40, No. 5, p. 69 (five pages).
Microsoft Press Computer Dictionary, Microsoft, 1997, Third Edition, pp. 75–76.
Syromyatnikov, I. Y., et al., "Performance Analysis of Video Conferencing on Homogenous and Heterogenous Networks," 1996, IEEE, vol. 2, pp. 548–551.

(Continued)

*Primary Examiner*—Kim Huynh
*Assistant Examiner*—Mike Nguyen
(74) *Attorney, Agent, or Firm*—Meyertons, Hood, Kivlin, Kowert & Goetzel, P.C.; Jeffrey C. Hood; Mark S. Williams

(57) ABSTRACT

A computing system in which a human interface (HI) is located remotely from a computer. The HI includes a keyboard, mouse, and monitor. The computer includes a motherboard with CPU, memory, network and interface logic, disk drives, and a power supply, configured on a single card, and communicates with the HI by sending and receiving encoded HI signals. The computer card includes an interfacing edge connector for communicating with the HI and networks. The HI logic receives HI signals from the interface logic and encodes the signals into a format suitable for transmission to the HI. The HI logic receives and decodes incoming encoded HI signals from the HI, and transmits the decoded HI signals to the interface logic for use in the computing system. The network logic encodes network signals into a format suitable for transmission to the network, and receives and decodes encoded network signals from the network.

55 Claims, 5 Drawing Sheets

U.S. PATENT DOCUMENTS

| | | |
|---|---|---|
| 5,150,243 A | 9/1992 | Suzuki |
| 5,193,200 A | 3/1993 | Asprey et al. |
| 5,257,390 A | 10/1993 | Asprey |
| 5,258,660 A | 11/1993 | Nelson et al. |
| 5,260,697 A | 11/1993 | Barrett et al. |
| 5,299,306 A | 3/1994 | Asprey |
| 5,311,302 A | 5/1994 | Berry et al. |
| 5,315,711 A * | 5/1994 | Barone et al. ............... 709/208 |
| 5,323,420 A | 6/1994 | Asprey |
| 5,337,025 A | 8/1994 | Polhemus |
| 5,337,413 A | 8/1994 | Lui et al. |
| 5,347,167 A | 9/1994 | Singh |
| 5,374,952 A | 12/1994 | Flohr |
| 5,386,574 A | 1/1995 | Asprey |
| 5,428,806 A * | 6/1995 | Pocrass ...................... 710/104 |
| 5,465,105 A | 11/1995 | Shatas et al. |
| 5,485,570 A | 1/1996 | Busboom et al. |
| 5,499,377 A | 3/1996 | Lee |
| 5,504,540 A | 4/1996 | Shatas |
| 5,550,593 A | 8/1996 | Nakabayashi |
| 5,557,775 A | 9/1996 | Shedletsky |
| 5,577,042 A | 11/1996 | McGraw, Sr. et al. |
| 5,577,205 A * | 11/1996 | Hwang et al. ............... 361/683 |
| 5,587,824 A | 12/1996 | Asprey |
| 5,598,401 A | 1/1997 | Blackwell et al. |
| 5,675,811 A | 10/1997 | Broedner et al. |
| 5,715,410 A | 2/1998 | Kim |
| 5,734,834 A | 3/1998 | Yoneyama |
| 5,748,890 A | 5/1998 | Goldberg et al. |
| 5,801,689 A | 9/1998 | Huntsman |
| 5,831,608 A | 11/1998 | Janay et al. |
| 5,841,977 A | 11/1998 | Ishizaki et al. |
| 5,867,821 A | 2/1999 | Ballantyne et al. |
| 5,884,096 A * | 3/1999 | Beasley et al. ............... 710/38 |
| 5,890,015 A | 3/1999 | Garney et al. |
| 5,926,172 A | 7/1999 | Hanley |
| 5,966,056 A | 10/1999 | Thornton |
| 5,987,065 A | 11/1999 | Candage |
| 6,012,101 A | 1/2000 | Heller et al. |
| 6,012,115 A | 1/2000 | Chambers et al. |
| 6,038,616 A | 3/2000 | Thornton et al. |
| 6,047,054 A | 4/2000 | Bayless et al. |
| 6,067,098 A | 5/2000 | Dye |
| 6,073,188 A * | 6/2000 | Fleming ...................... 710/38 |
| 6,112,264 A | 8/2000 | Beasley et al. |
| 6,119,146 A | 9/2000 | Heller et al. |
| 6,122,259 A * | 9/2000 | Ishida ........................ 370/260 |
| 6,150,997 A | 11/2000 | Asprey |
| 6,160,543 A | 12/2000 | Chen |
| 6,185,643 B1 | 2/2001 | Kirshtein et al. |
| 6,189,064 B1 | 2/2001 | MacInnis et al. |
| 6,212,584 B1 | 4/2001 | Nei |
| 6,219,695 B1 | 4/2001 | Guttag et al. |
| 6,265,951 B1 | 7/2001 | Kirshtein |
| 6,308,215 B1 | 10/2001 | Kolbet et al. |
| 6,333,750 B1 | 12/2001 | Odryna et al. |
| 6,353,866 B1 | 3/2002 | Fensore et al. |
| 6,363,452 B1 | 3/2002 | Lach |
| 6,377,629 B1 | 4/2002 | Stewart et al. |
| 6,378,001 B1 | 4/2002 | Aditham et al. |
| 6,380,945 B1 | 4/2002 | MacInnis et al. |
| 6,385,666 B1 | 5/2002 | Thornton et al. |
| 6,388,658 B1 | 5/2002 | Ahern et al. |
| 6,389,029 B1 | 5/2002 | McAlear |
| 6,412,031 B1 | 6/2002 | Grooters |
| 6,418,494 B1 | 7/2002 | Shatas et al. |
| 6,446,138 B1 | 9/2002 | Criscolo et al. |
| 6,501,480 B1 | 12/2002 | MacInnis et al. |
| 6,505,245 B1 | 1/2003 | North et al. |
| 6,513,069 B1 | 1/2003 | Abato et al. |
| 6,529,935 B1 | 3/2003 | MacInnis et al. |
| 6,539,438 B1 | 3/2003 | Ledzius et al. |
| 6,544,174 B2 | 4/2003 | West et al. |
| 6,557,170 B1 | 4/2003 | Wilder et al. |
| 6,564,274 B1 | 5/2003 | Heath et al. |
| 6,564,378 B1 | 5/2003 | Satterfield et al. |
| 6,570,579 B1 | 5/2003 | MacInnis et al. |
| 6,571,305 B1 | 5/2003 | Engler |
| 6,608,630 B1 | 8/2003 | MacInnis et al. |
| 6,630,945 B1 | 10/2003 | MacInnis et al. |
| 6,654,825 B2 * | 11/2003 | Clapp et al. .................. 710/60 |
| 6,708,247 B1 | 3/2004 | Barret et al. |
| 6,735,658 B1 | 5/2004 | Thornton |
| 2001/0000539 A1 | 4/2001 | Heller et al. |
| 2002/0010821 A1 | 1/2002 | Yu et al. |
| 2002/0056137 A1 | 5/2002 | Stewart et al. |
| 2002/0091850 A1 | 7/2002 | Perholtz et al. |
| 2002/0138682 A1 | 9/2002 | Shatas et al. |
| 2002/0145613 A1 | 10/2002 | MacInnis et al. |
| 2003/0117406 A1 | 6/2003 | MacInnis et al. |
| 2003/0158987 A1 | 8/2003 | MacInnis et al. |
| 2003/0206174 A1 | 11/2003 | MacInnis et al. |

OTHER PUBLICATIONS

Cox, John, "New breed of vendors embrace thin clients,", Aug. 31, 1998, Network World, pp. 1–3.

Seok Soo Kim et al., "DooRae Distance Home Study system On DooRae Framework for Integrated Home Information Service" 1997, IEEE, pp. 75–78.

I Okoth et al, "DVB–CI: Gateway to Truly Interactive Multimedia Environment", 1997, IEEE, pp. 465–469.

A. Hastings et al, "ISDN Centrex Applications in a Large Multinational Company", 1992, IEEE, pp. 1737–1742.

Paul Cronin, "An Introduction to TSAPI and Network Telephony", 1996, IEEE, pp. 48–54.

Oliver Baltuch, "The Future Trends of PC Card Host Controllers", 1995, IEEE, pp. 148–152.

* cited by examiner

COMPUTER ON A CARD WITH A REMOTE HUMAN INTERFACE

CONTINUATION DATA

This is a continuation-in-part of U.S. patent application Ser. No. 09/524,812, titled COMPUTER SYSTEM HAVING REMOTELY LOCATED I/O DEVICES, which was filed Mar. 14, 2000, whose inventors are Barry Thornton, Andrew Heller, Daniel Barrett, and Charles Ely, which is a continuation of U.S. patent application Ser. No. 09/072,320, titled COMPUTER SYSTEM WITH REMOTELY LOCATED INTERFACE WHERE SIGNALS ARE ENCODED AT THE COMPUTER SYSTEM, TRANSFERRED THROUGH A 4-WIRE CABLE, AND DECODED AT THE INTERFACE, which was filed May 4, 1998, whose inventors are Barry Thornton, Andrew Heller, Daniel Barrett, and Charles Ely, and which issued as U.S. Pat. No. 6,038,616, which claims benefit of U.S. Provisional Application 60/069,464, filed on Dec. 15, 1997.

BACKGROUND OF THE INVENTION

1. Field of the Invention

The present invention relates generally to computer systems and specifically to a computer on a card with a remote human interface.

2. Description of the Related Art

Many commercial businesses and enterprises make extensive use of personal computers (PCs) in their daily operations. Typically, each user of a personal computer in the enterprise has a networked PC at their desk or work area. As the number of networked computer systems utilized in an enterprise increases, the management of such resources becomes increasingly complex and expensive. Some of the manageability issues involved in maintaining a large number of networked computer systems include ease of installation and deployment, the topology and physical logistics of the network, asset management, scalability (the cost and effort involved in increasing the number of units), troubleshooting network or unit problems, support costs, software tracking and management, as well as the simple issue of physical space, be it floor space or room on the desktop. In addition, there are security issues regarding physical assets, data protection, and software control, as well as computer virus issues. In many business establishments, such as call centers, there is no need for the user to install software on his/her unit, and in fact, management may specifically forbid employees from doing so. However, the standard personal computer configuration inherently provides the user this ability because the system is typically located with the user, and includes a floppy drive, CDROM, and one or more hard drives. Ensuring that unauthorized software is not installed on any of the machines in the network involves periodically personally auditing the software contents of each machine, at substantial cost in time and effort.

Many of these issues may be addressed by centralizing the locations of the personal computers, such as by installing multiple PCs into a central frame or cabinet. Prior art systems have generally been applied to servers and have focused on installing a standard PC into a sliding cabinet, where the term "standard PC" refers to a motherboard with extension slots, floppy drives, hard drives, CD drive, and a general open architecture supporting most standard expansion cards.

Two variations of this approach are typical. The first is to stand a standard PC motherboard on its edge to create a taller, thinner PC. All connections are on a rear panel and any ancillary boards plug in perpendicular to the motherboard. The second variation consists of plugging the PC motherboard into a back plane (either vertical or horizontal) which also receives any ancillary cards required. Both of these configurations lend themselves to a slide-drawer approach to packaging. However, there are numerous disadvantages with these approaches due to the fact that various compromises in size and feature set have been made to accommodate a wide assortment of feature addition cards. Such disadvantages include a higher product cost and a large physical size for each unit. In addition, the terminations and connections at the back of each unit are awkward to use—in the case of the first approach the terminations are on the motherboard, requiring the removal of all connectors before removing the board from its slide drawer case; in the case of the back plane based system the edge connections for each card have a high number of connections which creates a connection environment which is both fragile and difficult to administer. Finally, the power supply for the computers is typically part of the drawer holding cabinet and is not located on the slide drawer, which means that there is a single point of failure for the entire system, i.e., if the power supply fails, all the computers fail.

If the computer systems are not used as servers, there is the additional issue of coupling each PC's human interface (HI) components to the computers in the central cabinet. Such components may include a keyboard, pointing device, such as a mouse or trackball, display device, such as a monitor, or any other human interface device. Locating each unit's HI at a remote location may be problematic due to distance limitations, such as those associated with the Universal Serial Bus (USB) protocol, and complex cabling requirements for transmission of video and computer peripheral signals. Current prior art systems which utilize commonly located computing systems have not provided any mechanism or logic on the computing system which enables the human interface associated with the computing system to be located at a remote location.

Therefore, an improved system is desired for configuring a computer system with the capability of communicating with a remote human interface.

SUMMARY OF THE INVENTION

The present invention comprises various embodiments of a computing system in which a human interface (HI), also referred to as a user interface, is located remotely from a computer. The components of the human interface may include a keyboard, a pointing device such as a mouse, a display device such as a computer monitor, and/or any other human interface components. The computer may communicate with the human interface by sending and receiving encoded human interface signals transmitted over one or more connecting cables.

The computer may include a subset or all of the elements that make up a standard Personal Computer (PC), such as a PC motherboard with a microprocessor CPU, memory, and interface logic, which may include network logic, I/O logic, and human interface logic, as well as other interface circuitry associated with a PC motherboard, configured on a single card.

In one embodiment, the I/O logic may include one or more of keyboard, mouse, video, audio, and/or USB logic which generate/receive respective I/O signals or human interface signals. Thus, human interface signals may include one or more of keyboard signals, mouse signals, video signals, audio signals, and/or USB signals for communication with one or more corresponding human interface devices, such as one or more keyboards, pointing devices, video displays, audio devices, and/or USB devices, respectively.

The I/O logic may be coupled to the human interface logic and may be operable to generate keyboard, pointing device, video, audio, and/or USB signals that are provided to the human interface logic as part of the communicated human interface signals. The human interface logic may enable human interface signals from the computer to be encoded and transmitted to a remote location. The human interface logic may also be operable to receive encoded keyboard, pointing device, video, audio, and/or USB signals as part of the encoded human interface signals, and to decode the encoded signals. The I/O logic may be further operable to receive the decoded signals from the human interface logic.

The human interface logic comprised on the printed circuit board may thus be operable to receive one or more human interface signals from the I/O logic and encode the signals into a format suitable for transmission to a remote location, i.e., the remote human interface. The computer card may also include an interfacing edge connector which may be operable to transmit Ethernet signals as well as other peripheral or network signals to the user interface or network, respectively. In one embodiment the computing system may further include a human interface connector coupled to the human interface logic, which may be adapted to couple to one or more transmission lines or cables for transmission of the encoded human interface signals to the remote location. In one embodiment the human interface connector may be comprised on the edge connector. In one embodiment, the human interface logic may also be operable to receive one or more incoming encoded human interface signals from the remote human interface through the human interface connector, and to decode the incoming encoded human interface signals to produce decoded human interface signals which may be transmitted to the I/O logic for use in the computing system.

In one embodiment, the network logic comprised on the motherboard may include a LAN interface, Ethernet, or other network interface for interfacing with a network. The network logic may be operable to encode network signals into a format suitable for transmission to the network. The network logic may also be operable to receive encoded network signals from the network, and to decode the encoded network signals.

In one embodiment the computing system may include a cabinet, referred to as a cage, which has a plurality of slots. The computer card may be adapted to be inserted into one of the slots of the cage. The cage may include a cage connector which is adapted to couple to the human interface connector on the computer card. The cage connector may also include an external second connector which is electrically coupled to the computer card when the computer card is inserted into the slot. The external second connector may be further adapted to couple to the one or more cables for communication of the encoded one or more human interface signals with the remote location, i.e., the remote human interface.

In a preferred embodiment, the computer card may have a long rectangular form factor, with the computer components mounted on one side. The computer card may be electrically coupled to the cage through the edge connector which faces to the rear of the computer card assembly. In the preferred embodiment the order of the elements from front to back are set to provide the greatest cooling for the hottest elements. The network logic, which may comprise one or more LAN or WAN connections, typically IEEE803.2 (10/100 BaseT) Ethernet, and circuitry for connecting to the human interface devices (HID), is located at the rear of the computer card frame, while the power supply and non-volatile memory (disk drive) are located at the front of the frame. In the preferred embodiment of the invention, the computer card is operable to slide into a slot of the cage, thereby making contact with the cage connector.

In one embodiment, multiple computer cards may be inserted into the slots of the cage. Each computer card may be inserted into a cage slot, and may thereby be coupled to a keyboard, mouse, and monitor, which comprise the human interface for that computer card. Thus, the computer cards may all be installed in the cage at a central location, while the user interface for each computer card may be located remotely from the cage, such as at the respective work areas of the users of the computer cards. It should be noted that the human interface devices described here are for illustration purposes only, and that the actual type and number of devices used in each human interface may vary.

Each computer card may also be coupled to one or more networks through the on-board network logic. The networks may be one or more of a Local Area Network (LAN) or a Wide Area Network (WAN), such as the Internet. In one embodiment, the computer cards may be inserted into respective slots of the cage, and coupled to respective user interfaces through the cage connector and one or more human interface cables. In one embodiment, each computer card may also be coupled to the one or more networks through the cage connector and one or more network cables, such as an Ethernet cable.

In one embodiment, the motherboard may further include logic supporting PCI slot-based feature cards. The computer card may also include one or more hard disk drives or optical drives and a power supply which may be operable to convert the local main power to the appropriate voltages for the computer. The computer card may include a slide drawer frame and communicate with external systems via an edge connector. In one embodiment the edge connector may be operable to communicate network signals with a network, and an encoded set of human interface signals including video, keyboard, mouse, USB, and other human interface device signals with the human interface.

BRIEF DESCRIPTION OF THE DRAWINGS

Other advantages and details of the invention will become apparent upon reading the following detailed description and upon reference to the accompanying drawings in which.

Figure 1:
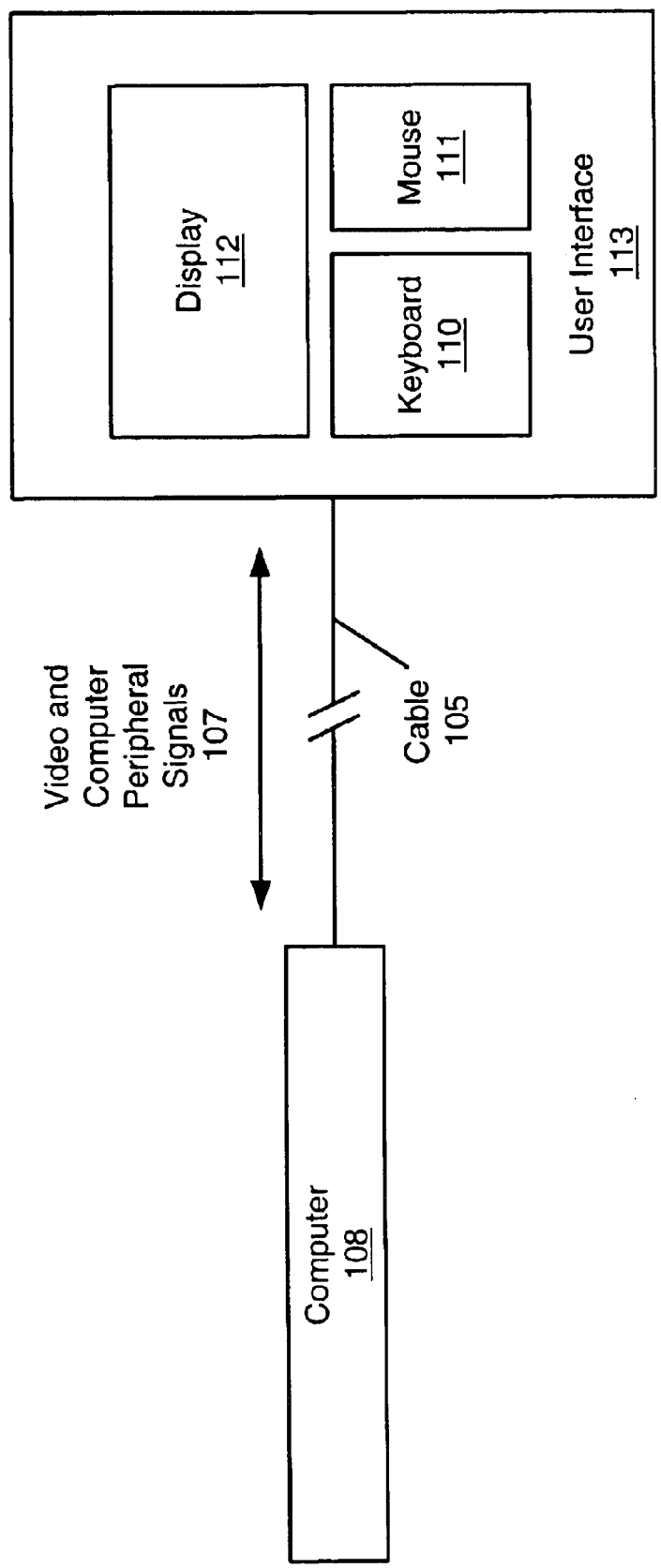
FIG. 1 is a block diagram of a system comprising a host computer coupled to a remote user interface, according to one embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Incorporation by Reference

U.S. Provisional Patent 60/144,809 titled "A Technique To Extend The Operating Distance Of A Universal Serial Bus" is hereby incorporated by reference in its entirety as though fully and completely set forth herein.

U.S. Pat. No. 6,119,146 titled "Computer Network Having Multiple Remotely Located Human Interfaces Sharing A Common Computing System", which was filed May 4, 1998, whose inventors are Barry Thornton, Andrew Heller, Daniel Barrett, and Charles Ely, is hereby incorporated by reference in its entirety as though fully and completely set forth herein.

U.S. Pat. No. 6,038,616 titled "Computer System With Remotely Located Interface Where Signals Are Encoded At The Computer System, Transferred Through A 4-Wire Cable, And Decoded At The Interface", which was filed May 4, 1998, whose inventors are Barry Thornton, Andrew Heller, Daniel Barrett, and Charles Ely, is hereby incorporated by reference in its entirety as though fully and completely set forth herein.

U.S. Pat. No. 6,037,884 titled "Technique To Encode Multiple Digital Data Streams In Limited Bandwidth For Transmission In A Single Medium", which was filed Oct. 27, 1997, whose inventor is Barry Thornton, is hereby incorporated by reference in its entirety as though fully and completely set forth herein.

U.S. Pat. No. 6,020,839 titled "Analog Technique To Detect Asymmetric Radio Frequency Pulses", which was filed Oct. 27, 1997, whose inventor is Barry Thornton, is hereby incorporated by reference in its entirety as though fully and completely set forth herein.

U.S. Pat. No. 6,012,101 titled "Computer Network Having Commonly Located Computing Systems", which was filed May 4, 1998, whose inventors are Andrew Heller, Barry Thornton, Daniel Barrett, and Charles Ely, is hereby incorporated by reference in its entirety as though fully and completely set forth herein.

U.S. Pat. No. 5,994,952 titled "Narrow Band-Pass Interferometric Filter Having Enhanced Operational Characteristics", which was filed Oct. 22, 1997, whose inventor is Barry Thornton, is hereby incorporated by reference in its entirety as though fully and completely set forth herein.

U.S. Pat. No. 5,966,056 titled "Method And Apparatus For Enabling The Transmission Of Multiple Wide Bandwidth Electrical Signals", which was filed Jul. 3, 1996, whose inventor is Barry Thornton, is hereby incorporated by reference in its entirety as though fully and completely set forth herein.

U.S. Pat. No. 5,926,172, titled "Video Data Transmission And Display System And Associated Methods For Encoding/Decoding Synchronization Information And Video Data", which was filed Sep. 23, 1997, whose inventor is Williams Hanley, is hereby incorporated by reference in its entirety as though fully and completely set forth herein.

U.S. patent application Ser. No. 09/179,809 titled "A Technique To Transfer Multiple Data Streams Over A Wire Or Wireless Medium" is hereby incorporated by reference in its entirety as though fully and completely set forth herein.

U.S. patent application Ser. No. 09/619,989 titled "System And Method For Providing A Remote Universal Serial Bus", which was filed Jul. 20, 2000, whose inventors are Dan Barrett, Mike Barron, and Andrew Heller, is hereby incorporated by reference in its entirety as though fully and completely set forth herein.

U.S. patent application Ser. No. 09/680,760 titled "System And Method For Combining Computer Video And Remote Universal Serial Bus In An Extended Cable", which was filed Oct. 6, 2000, whose inventor is Barry Thornton, is hereby incorporated by reference in its entirety as though fully and completely set forth herein.

FIG. 1: A Computer System Coupled to a Remote User Interface

FIG. 1 is a block diagram of a computing system comprising a computer 108 and a human interface (HI) 113 located remotely from the computer 108. One or more connecting cables 105 may connect the computer 108 to the HI 113. As FIG. 1 shows, in one embodiment, the components of the HI may include a keyboard 110, a pointing device such as a mouse 111, a display device 112 such as a computer monitor, and/or any other human interface components. The computer 108 may communicate with the human interface 113 by sending and/or receiving encoded human interface signals 107 transmitted over the one or more connecting cables 105. The separation of the human interface 113 from the computer 108 may provide a number of benefits to a business or enterprise, including the isolation of means to install software, such as CDROMs, from the user, as well as the central location of multiple computers which may simplify both hardware and software maintenance. Further benefits of the system of FIG. 1 are described in U.S. Pat. No. 6,012,101. Further details of the system are provided below with respect to FIG. 2.

Figure 2:
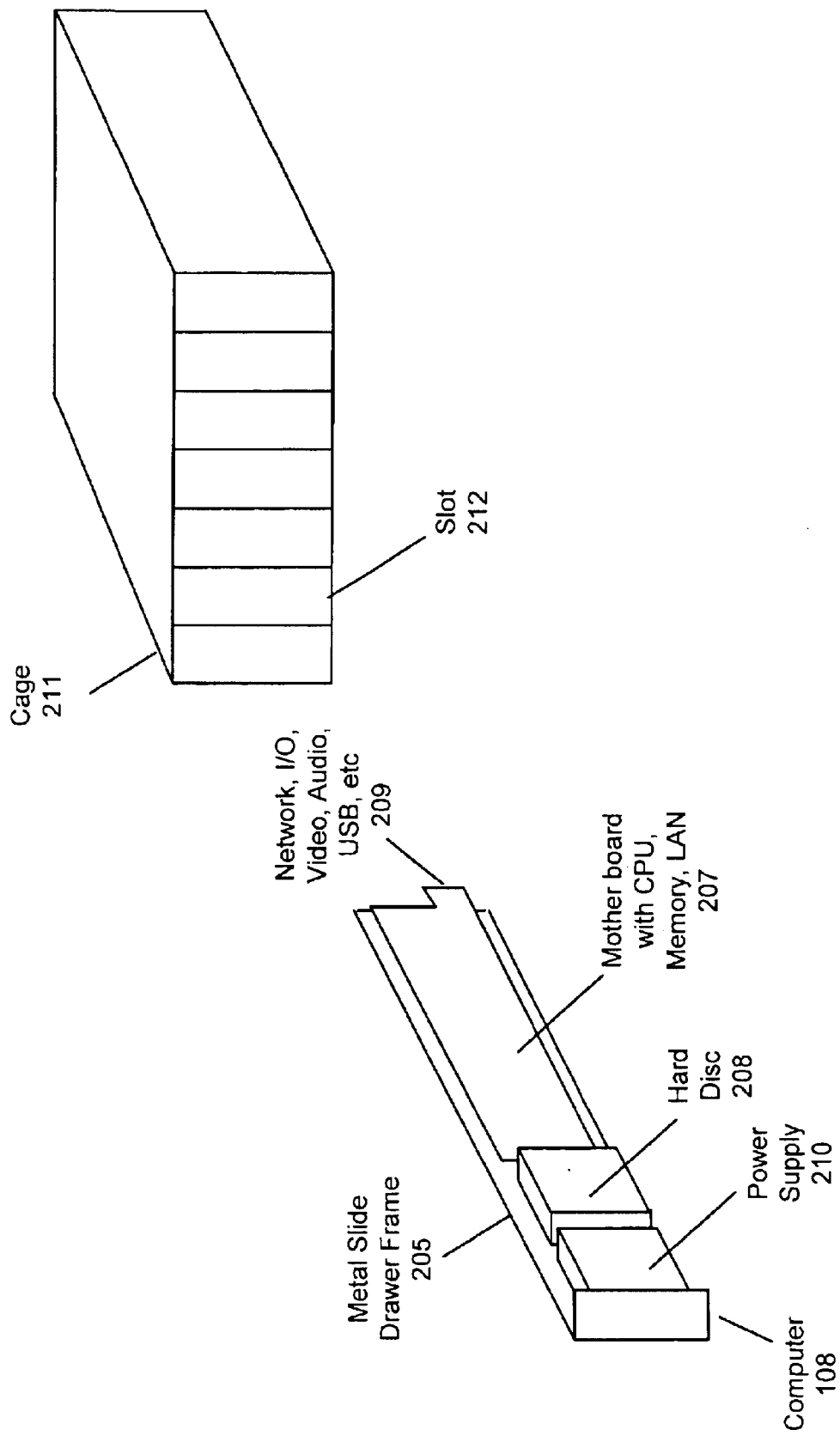
FIG. 2 illustrates a computer card mounted on a slide drawer, according to one embodiment.

FIG. 2: A Computer Card Including a Slide Drawer Frame

FIG. 2 illustrates one embodiment of computing system 108 in the form of a computer card. As FIG. 2 shows, in one embodiment the computing system may include slide drawer frame 205, printed circuit board 207 (or motherboard) mounted to the frame 205, and non-volatile memory 208 such as a hard drive or optical drive, also comprised on the frame 205. The computer card may communicate with external systems via edge connector 209. In one embodiment the edge connector 209 may be operable to communicate network signals with a network and an encoded set of human interface signals including video, keyboard, mouse, USB, and other human interface device signals with human interface 113. In one embodiment the computing system may further include power supply 210 mounted on the frame 205 and coupled to an external power source, which may be operable to provide power at the proper voltages to the computer 108.

As FIG. 2 also shows, in one embodiment the computing system may include a cabinet, referred to as a cage 211, having a plurality of slots 212. The computer card may be adapted to be inserted into one of the slots of the cage. The cage 211 may include a cage connector which is adapted to couple to the edge connector 209 on the computer card. The cage connector may also include an external second connector which is electrically coupled to the computer card 108 when the computer card 108 is inserted into the slot. The external second connector may be further adapted to couple to the one or more cables 105 for communication of the encoded one or more human interface signals with the remote location, i.e., the remote human interface 113. The use of the cage connector as an intermediate connection between computer cards 108 and the cables 105 allows the removal and/or exchange of computer cards 108 without the need to disconnect the cables 105 from the cage. If a particular computer card unit becomes nonfunctional, it may be removed and a new computer card inserted in its place very simply and quickly.

In the preferred embodiment of the invention, the computer card 108 is operable to slide into a slot of the cage 211, thereby making contact with the cage connector. The computer card may comprise a complete PC on a single slide drawer frame which may be only 3 rack units high (5.25 inches), and thus may occupy a much smaller space than standard PC units. Further details of the computer card 108 are presented below with reference to FIG. 3.

Figure 3:
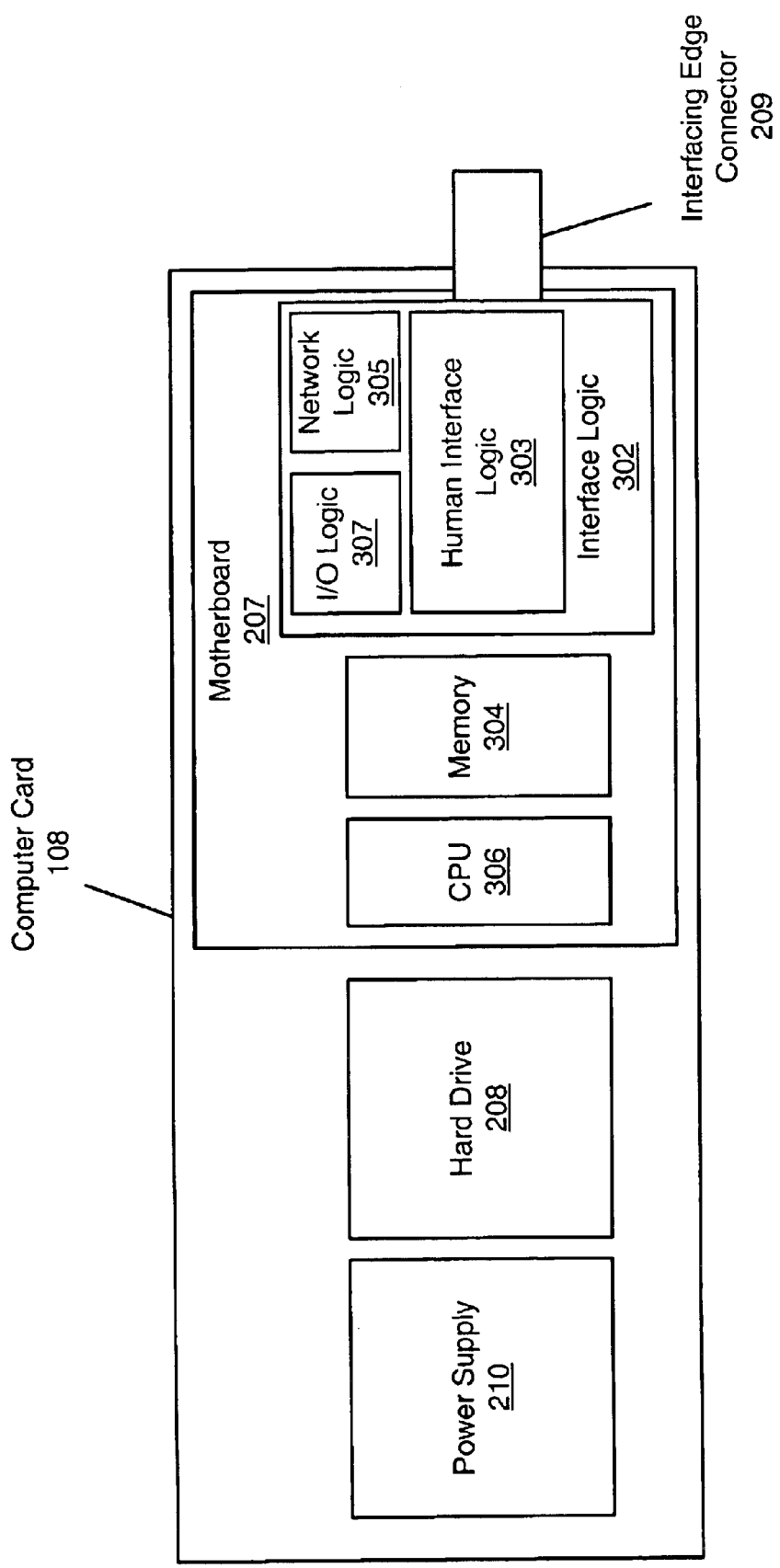
FIG. 3 is a detailed diagram of the computer card of FIG. 2.

FIG. 3. A Computer on a Card

FIG. 3 illustrates the computer card of FIG. 2, according to one embodiment. As FIG. 3 shows, the computer 108 may include a subset or all of the elements that make up a standard Personal Computer, such as PC motherboard 207 with various components such as a microprocessor CPU 306, memory 304, and interface logic 303 configured on a single card. In one embodiment, the interface logic 303 may include I/O logic 307, network logic 305, and human interface logic 303. In one embodiment, the network logic 305 may include a LAN interface, Ethernet, or any other network interface. In one embodiment, the I/O logic 307 may include video, audio, USB, and/or any other I/O interface circuitry associated with a PC motherboard. As shown, the computer card 108 may also include interfacing edge connector 209, which may be operable to transmit video, mouse, keyboard, USB, and Ethernet signals, as well as any other peripheral or network signals. In one embodiment, the edge connector 209 may include a human interface connector which may be operable to communicate human interface signals between the human interface logic 303 and human interface 113.

The human interface logic 303 comprised on the printed circuit board 207 may be operable to receive one or more human interface signals 107 from the I/O logic and encode the signals into a format suitable for transmission to a remote location, i.e., the remote human interface 113. In one embodiment the human interface logic 303 may be adapted to couple to the one or more cables 105 for transmission of the encoded human interface signals 107 to the remote location, such as through the human interface connector comprised on edge connector 209. In one embodiment, the human interface logic 303 may also be operable to receive one or more incoming encoded human interface signals 107 from the remote human interface 113 through the human interface connector, and to decode the incoming encoded human interface signals 107 to produce decoded human interface signals which may be transmitted to the I/O logic for use in the computing system. In one embodiment the human interface signals 107 sent and received by the human interface logic 303 may be encoded into a format for transmission over a distance exceeding 20 feet. In another embodiment, the human interface logic 303 may be operable to send and receive two or more encoded human interface signals 107 to and from the remote location. In yet another embodiment, the human interface logic 303 may be operable to send and receive three or more encoded human interface signals 107 to and from the remote location. For more information regarding the encoding and transmission of human interface signals over extended distances, please see U.S. Pat. No. 6,038,616 titled "Computer System With Remotely Located Interface Where Signals Are Encoded At The Computer System, Transferred Through A 4-Wire Cable, And Decoded At The Interface" by Thornton, et al., which is incorporated by reference above.

In one embodiment, the human interface signals 107 communicated between the computer 108 and the human interface 113 may include one or more of a video signal, keyboard signal, and pointing device signal, such as a mouse signal. In another embodiment, the communicated human interface signals 107 may include two or more of a video signal, keyboard signal, and pointing device signal. In a further embodiment, the communicated human interface signals 107 may include three or more of a video signal, keyboard signal, pointing device signal, and audio signal. In yet another embodiment, the human interface signals 107 may include USB signals for communication with one or more USB devices.

In one embodiment, interface logic of the computing system 108 may include keyboard logic comprised on the printed circuit board 207 for interfacing to keyboard 110. The keyboard logic may be coupled to the human interface logic and may be operable to generate keyboard signals that are provided to the human interface logic as part of the communicated human interface signals described above. The human interface logic 303 may also be operable to receive encoded keyboard signals as part of the encoded human interface signals described above, and to decode the encoded keyboard signals. The keyboard logic may be further operable to receive the decoded keyboard signals from the human interface logic 303.

In one embodiment, interface logic of the computing system 108 may include pointing device logic comprised on the printed circuit board 207 for interfacing to a pointing device 111. The pointing device logic may be coupled to the human interface logic 303 and may be operable to generate pointing device signals that are provided to the human interface logic 303 as part of the communicated human interface signals described above. The human interface logic 303 may also be operable to receive encoded pointing device signals as part of the encoded human interface signals 107 described above, and to decode the encoded pointing device signals. The pointing device logic may be further operable to receive the decoded pointing device signals from the human interface logic 303.

In one embodiment, interface logic of the computing system 108 may include USB logic comprised on the printed circuit board 207 for interfacing to a USB device. The USB logic may be coupled to the human interface logic 303 and may be operable to generate USB signals that are provided to the human interface logic 303 as part of the communicated human interface signals described above. The human interface logic 303 may also be operable to receive encoded USB signals as part of the encoded human interface signals described above, and to decode the encoded USB signals. The USB logic may be further operable to receive the decoded USB signals from the human interface logic 303.

In one embodiment, interface logic of the computing system 108 may include video logic comprised on the printed circuit board 207 for interfacing to a video device. The video logic may be coupled to the human interface logic 303 and may be operable to generate video signals that are provided to the human interface logic 303 as part of the communicated human interface signals described above. The human interface logic 303 may also be operable to receive encoded video signals as part of the encoded human interface signals 107 described above, and to decode the encoded video signals. The video logic may be further operable to receive the decoded video signals from the human interface logic 303.

In one embodiment, interface logic of the computing system 108 may include audio logic comprised on the printed circuit board 207 for interfacing to an audio device. The audio logic may be coupled to the human interface logic 303 and may be operable to generate audio signals that are provided to the human interface logic 303 as part of the communicated human interface signals described above. The human interface logic 303 may also be operable to receive encoded audio signals as part of the encoded human interface signals 107 described above, and to decode the encoded audio signals. The audio logic may be further operable to receive the decoded audio signals from the human interface logic 303.

In one embodiment, the computing system may further comprise network interface logic 305 comprised on the printed circuit board for interfacing to a network. The network logic 305 may be operable to encode network signals into a format suitable for transmission to the network. The network logic 305 may also be operable to receive encoded network signals from the network, and to decode the encoded network signals.

In one embodiment, the motherboard 207 may further include logic supporting PCI slot-based feature cards. The computer card 108 may also include one or more hard disk drives 208 or optical drives, and a power supply 210 which may be operable to convert the local main power to the appropriate voltages for the computer 108.

In a preferred embodiment, the computer card may have a long rectangular form factor, with the computer components mounted on one side. The computer card may be electrically coupled to the cage through edge connector 209 which faces to the rear of the computer card assembly. In the preferred embodiment the order of the elements from front to back are set to provide the greatest cooling for the hottest elements. The interface logic 302, which may comprise network logic 305, such as one or more LAN or WAN connections, typically IEEE803.2 (10/100 BaseT) Ethernet, as well as I/O 307 and human interface logic 303 for connecting to the human interface devices (HID), is located at the rear of the computer card frame, while the power supply and non-volatile memory (disk drive) are located at the front of the frame. The fact that each computer card has its own power supply on-board means that in the event of a power supply failure, only the affected computer card will fail. This feature is in contrast with prior art systems in which there is a single power supply located in the cabinet which supplies power to multiple computing units, thus presenting a single point of failure for the system.

In various other embodiments, the computer card may have various different form factors, including two dimensional forms, such as a square or rectangles of various proportions, as well as three-dimensional forms, such as a cubic form, or three dimensional rectangular forms of various proportions. In various embodiments, the computer card may be designed with components mounted on either or both sides of the card. In the various three dimensional embodiments, the components may be mounted on the inside surfaces of the form, the outside surfaces of the form, or both.

Figure 4:
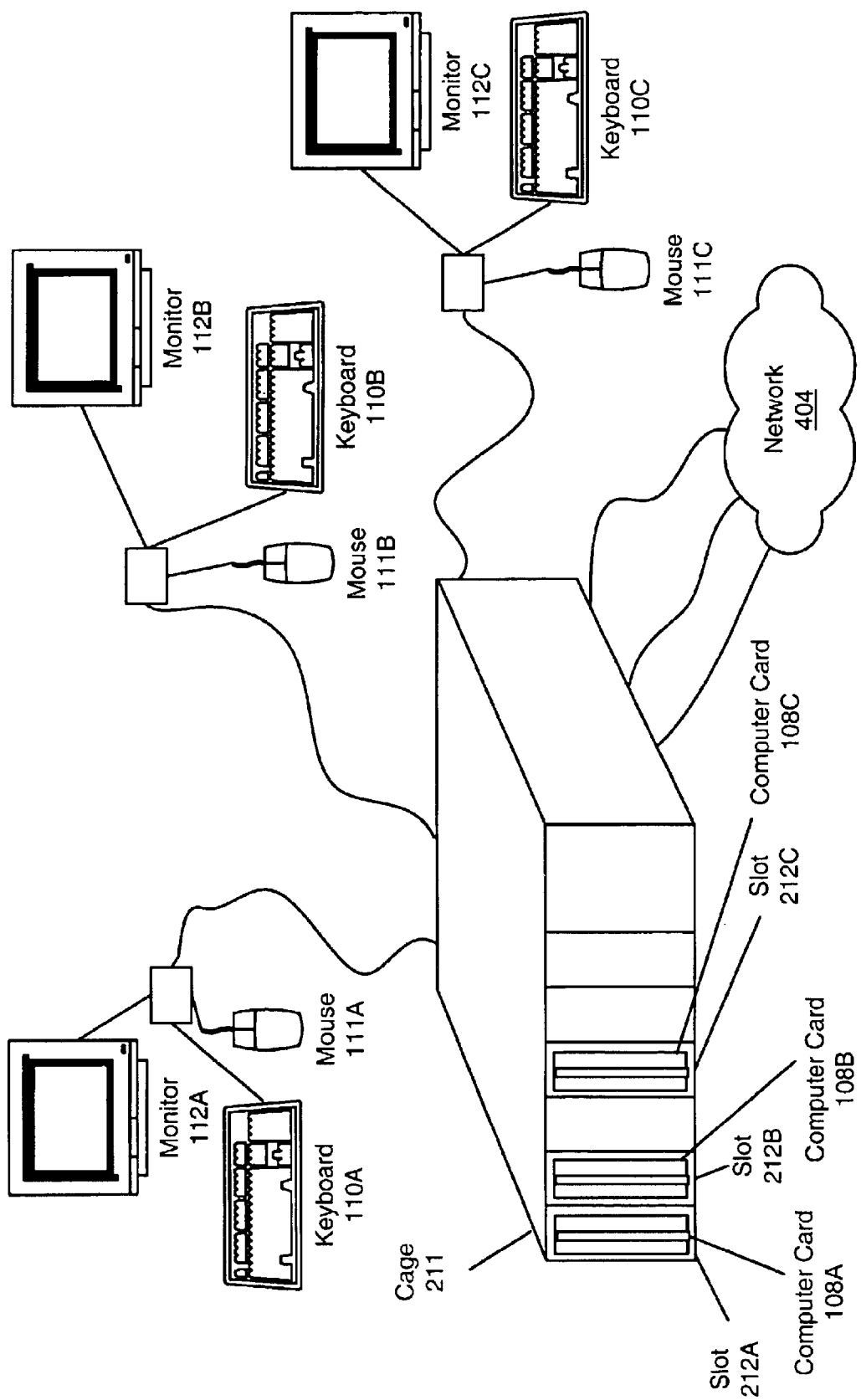
FIG. 4 illustrates a computing system comprising a plurality of computer cards coupled to a plurality of corresponding user interfaces.

FIG. 4: Multiple Computer Systems with Remote Human Interfaces

FIG. 4 illustrates an embodiment of the computing system in which multiple computer cards 108 are inserted into the slots of the cage 211. As FIG. 4 shows, each computer card 108 may be coupled to a plurality of human interface devices through the cage connector and cables. As shown, computer card 108A may be inserted into cage slot 212A, and may thereby be coupled to keyboard 110A, mouse, 111A, and monitor 112A, which comprise the human interface 113A for that computer card. Computer cards 108B and 108C may be similarly inserted into respective slots 212B and 212C and coupled to respective human interface devices 113B and 113C as shown. Thus, the computer cards 108 may all be installed in the cage 211 at a central location, while the user interface 113 for each computer card 108 may be located remotely from the cage, such as at the respective work areas of the users of the computer cards. It should be noted that the human interface devices shown here are for illustration purposes only, and that the actual type and number of devices comprised in each human interface may vary.

FIG. 4 also shows that each computer card 108 may be coupled to a network 404. As described above with reference to FIG. 3, each computer card may include network logic for interfacing to the network 404. The network 404 may be one or more of a Local Area Network (LAN) or a Wide Area Network (WAN), such as the Internet.

Figure 5:
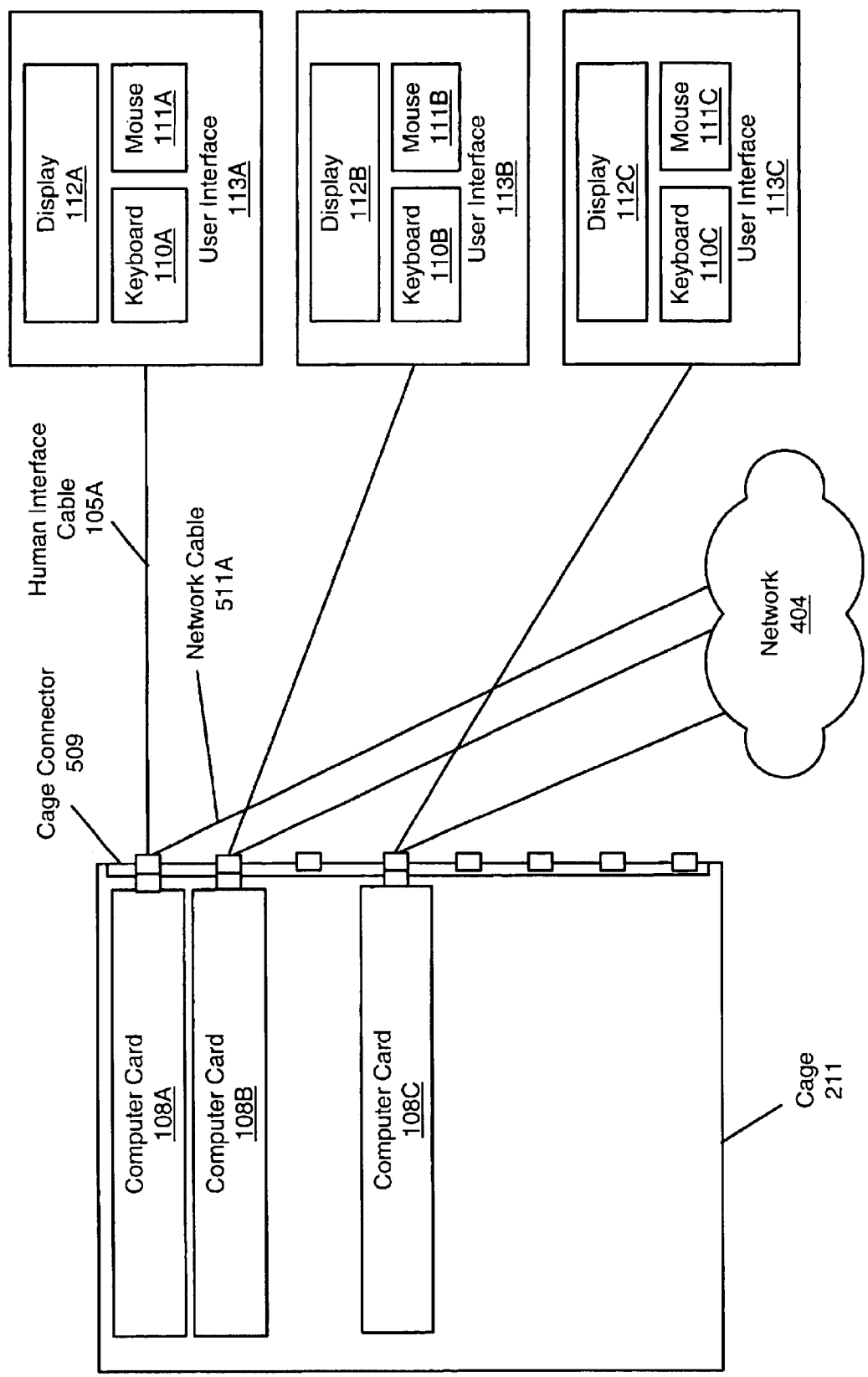
FIG. 5 is a block diagram of the computing system of FIG. 4.

FIG. 5: A Block Diagram of Multiple Computer Systems with Remote Human Interfaces FIG. 5 is a block diagram of the system described above with reference to FIG. 4. As FIG. 5 shows, the cage 211 may include cage connector 212 which is operable to couple to one or more human interface cables 105 for coupling to human interface devices and to one or more network cables 511 for coupling to one or more networks, respectively. In one embodiment, the computer cards 108 may be inserted into respective slots 212 of the cage 211, and coupled to respective user interfaces 113 through cage connector 509 and one or more human interface cables 105, such as cable 105A. Each user interface 113 may include one or more human interface devices, such as keyboard 110, mouse, 111, and monitor 112, or any other human interface device. As FIG. 5 also shows, each computer card 108 may also be coupled to network 404 through the cage connector 509 and the one or more network cables 511, such as 511A. In one embodiment, the network cable 511 may comprise an Ethernet cable. Thus, multiple computer cards 108 may be installed in a centrally located computer cage 211, and coupled to remote human interfaces 113 and network 404.

The system described above solves many of the problems of the prior art. By centralizing the location of the computing elements while permitting the remote location of the human interfaces to the computers, the management of both the hardware and software may be greatly simplified. As the hardware and software for all units are in one place, an administrator may install, deploy, and troubleshoot hardware units and software more easily, which improves the scalability of the system and decreases support costs. The central location of the computing hardware and software also allows the administrator to manage access to both the hardware and software more easily, which greatly increases the security of the system. Additionally, the central location of all computing hardware simplifies the physical topology of the network. The central location of the computing hardware also may increase the reliability of the system by allowing greater thermal management of the system, i.e., because the units are all kept in one location, the temperature may be regulated for optimum conditions. Additionally, because the system uses a plurality of substantially homogeneous computing elements (the computer cards), there is less variation in the system components, which improves compatibility and maintainability of the system. The removal of the computing hardware from the user's workspace improves the physical environment of the user by either freeing up desktop space or floor space. Finally, because the system combines all the user interface signals for a computer card into a single user interface cable, the cabling requirements for each computer are reduced, thus simplifying the cabling for the overall system.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A computing system,
comprising: a computer card, wherein the computer card comprises: a frame;
a printed circuit board mounted to the frame;
a CPU comprised on the printed circuit board;
a memory comprised on the printed circuit board;
a non-volatile memory comprised on the frame;
human interface logic comprised on the printed circuit board which is operable to receive one or more human interface signals and encode the one or more human interface signals into a format suitable for transmission to a remote location; and
a human interface connector coupled to the human interface logic, wherein the human interface connector is configured to couple to one or more cables for transmission of the encoded one or more human interface signals to the remote location,
wherein the computer card is dedicated to a specific human interface, and wherein the non-volatile memory on the frame is dedicated to a plurality of files used by a user of the specific human interface for which the computer card is dedicated.

2. The computing system of claim 1, wherein the human interface logic is operable to encode the one or more human interface signals into a format suitable for transmission of a distance greater than 20 feet to the remote location.

3. The computing system of claim 1, wherein the human interface logic is operable to receive two or more human interface signals and encode the two or more human interface signals into a format suitable for transmission to the remote location.

4. The computing system of claim 3, wherein the two or more human interface signals comprise two or more of a video signal, keyboard signal, and pointing device signal.

5. The computing system of claim 3, wherein the two or more human interface signals comprise three or more of a video signal, keyboard signal, pointing device signal, and audio signal.

6. The computing system of claim 1, further comprising keyboard logic comprised on the printed circuit board for interfacing to a keyboard;
wherein the keyboard logic is coupled to the human interface logic;
wherein the keyboard logic generates keyboard signals that are provided to the human interface logic, wherein the one or more human interface signals include the keyboard signals;
wherein the human interface logic is operable to receive the keyboard signals; and
wherein the human interface logic is operable to encode the keyboard signals into a format suitable for transmission to the remote location.

7. The computing system of claim 1, further comprising pointing device logic comprised on the printed circuit board for interfacing to a pointing device;
wherein the pointing device logic is coupled to the human interface logic;
wherein the pointing device logic generates pointing device signals that are provided to the human interface logic, wherein the one or more human interface signals include the pointing device signals;
wherein the human interface logic is operable to receive the pointing device signals; and
wherein the human interface logic is operable to encode the pointing device signals into a format suitable for transmission to the remote location.

8. The computing system of claim 1, further comprising:
keyboard logic comprised on the printed circuit board for interfacing to a keyboard; and
pointing device logic comprised on the printed circuit board for interfacing to a pointing device;
wherein each of the keyboard logic and the pointing device logic is coupled to the human interface logic;
wherein the keyboard logic generates keyboard signals that are provided to the human interface logic;
wherein the pointing device logic generates pointing device signals that are provided to the human interface logic; and
wherein the encoded one or more human interface signals include encoded keyboard signals and encoded pointing device signals.

9. The computing system of claim 1, further comprising USB logic comprised on the printed circuit board for interfacing to a USB device;
wherein the USB logic is coupled to the human interface logic;
wherein the USB logic generates USB signals that are provided to the human interface logic, wherein the one or more human interface signals include the USB signals;
wherein the human interface logic is operable to receive the USB signals; and
wherein the human interface logic is operable to encode the USB signals into a format suitable for transmission to the remote location.

10. The computing system of claim 1, further comprising video logic comprised on the printed circuit board for interfacing to a video display device;
wherein the video logic is coupled to the human interface logic;
wherein the video logic generates video signals that are provided to the human interface logic, wherein the one or more human interface signals include the video signals;
wherein the human interface logic is operable to receive the video signals; and
wherein the human interface logic is operable to encode the video signals into a format suitable for transmission to the remote location.

11. The computing system of claim 1, further comprising audio logic comprised on the printed circuit board for interfacing to an audio device;

wherein the audio logic is coupled to the human interface logic;
wherein the audio logic generates audio signals that are provided to the human interface logic, wherein the one or more human interface signals include the audio signals;
wherein the human interface logic is operable to receive the audio signals; and
wherein the human interface logic is operable to encode the audio signals into a format suitable for transmission to the remote location.

12. The computing system of claim 1, further comprising network interface logic comprised on the printed circuit board for interfacing to a network, wherein the network logic is operable to encode network signals into a format suitable for transmission to the network.

13. The computing system of claim 1, further comprising a power supply comprised on the frame, wherein the power supply is operable to couple to an external power source and supply power to the computing system.

14. The computing system of claim 1, further comprising:
a cage having a plurality of slots, wherein the computer card is configured to be inserted into a slot of the cage, wherein the cage includes a cage connector which is configured to couple to the human interface connector on the computer card, wherein the cage connector also includes an external second connector electrically coupled to the cage connector, wherein the external second connector is configured for coupling to the one or more cables for transmission of the encoded one or more human interface signals to the remote location.

15. The computing system of claim 1, wherein components on the computer card are arranged on the computer card with higher heat generating components near a front of the computer card.

16. A computing system,
comprising: a computer card, wherein the computer card comprises:
a frame;
a printed circuit board mounted to the frame;
a CPU comprised on the printed circuit board;
a memory comprised on the printed circuit board;
a non-volatile memory comprised on the frame;
a human interface connector configured to couple to one or more cables for reception of encoded one or more human interface signals from a remote location, wherein the encoded one or more human interface signals are encoded in a format suitable for transmission from the remote location to the computing system; and
human interface logic comprised on the printed circuit board and coupled to the human interface connector, wherein the human interface logic is operable to receive the encoded one or more human interface signals from the remote location, wherein the human interface logic is operable to decode the encoded one or more human interface signals to produce decoded human interface signals;
wherein the decoded human interface signals are useable in the computing system;
wherein the computer card is dedicated to a specific human interface, and wherein the non-volatile memory on the frame is dedicated to a plurality of files used by a user of the specific human interface for which the computer card is dedicated.

17. The computing system of claim 16, wherein the human interface logic is operable to decode the one or more human interface signals from a format suitable for transmission of a distance greater than 20 feet from the remote location.

18. The computing system of claim 16, wherein the human interface logic is operable to receive incoming encoded two or more human interface signals from the remote location and decode the encoded two or more human interface signals from a format suitable for transmission from the remote location.

19. The computing system of claim 18, wherein the incoming encoded two or more human interface signals comprise two or more of an incoming encoded video signal, keyboard signal, and pointing device signal.

20. The computing system of claim 18, wherein the incoming encoded two or more human interface signals comprise three or more of an incoming encoded video signal, keyboard signal, pointing device signal, and audio signal.

21. The computing system of claim 16, further comprising keyboard logic comprised on the printed circuit board for interfacing to a keyboard;
wherein the keyboard logic is coupled to the human interface logic;
wherein the human interface logic is operable to receive the keyboard signals from the remote location;
wherein the human interface logic is operable to decode the encoded keyboard signals from a format suitable for transmission from the remote location;
wherein the keyboard logic receives the decoded keyboard signals from the human interface logic; and
wherein the decoded human interface signals include the decoded keyboard signals.

22. The computing system of claim 16, further comprising pointing device logic comprised on the printed circuit board for interfacing to a pointing device;
wherein the pointing device logic is coupled to the human interface logic;
wherein the human interface logic is operable to receive the pointing device signals from the remote location;
wherein the human interface logic is operable to decode the encoded pointing device signals from a format suitable for transmission from the remote location;
wherein the pointing device logic receives the decoded pointing device signals from the human interface logic; and
wherein the decoded human interface signals include the decoded pointing device signals.

23. The computing system of claim 16, further comprising:
keyboard logic comprised on the printed circuit board for interfacing to a keyboard; and
pointing device logic comprised on the printed circuit board for interfacing to a pointing device;
wherein each of the keyboard logic and the pointing device logic is coupled to the human interface logic;
wherein the keyboard logic receives decoded keyboard signals that are provided by the human interface logic;
wherein the pointing device logic receives decoded pointing device signals that are provided by the human interface logic; and
wherein the decoded human interface signals include the decoded keyboard signals and the decoded pointing device signals.

24. The computing system of claim 16, further comprising USB logic comprised on the printed circuit board for interfacing to a USB device;

wherein the USB logic is coupled to the human interface logic;

wherein the human interface logic is operable to receive encoded USB signals from the remote location;

wherein the human interface logic is operable to decode the encoded USB signals from a format suitable for transmission from the remote location;

wherein the USB logic receives the decoded USB signals from the human interface logic; and wherein the decoded human interface signals include the decoded USB signals.

25. The computing system of claim 16, further comprising video logic comprised on the printed circuit board for interfacing to a video display device;

wherein the video logic is coupled to the human interface logic;

wherein the human interface logic is operable to receive encoded video signals from the remote location;

wherein the human interface logic is operable to decode the encoded video signals from a format suitable for transmission from the remote location;

wherein the video logic receives the decoded video signals from the human interface logic; and wherein the decoded human interface signals include the decoded video signals.

26. The computing system of claim 16, further comprising audio logic comprised on the printed circuit board for interfacing to an audio device;

wherein the audio logic is coupled to the human interface logic;

wherein the human interface logic is operable to receive encoded audio signals from the remote location;

wherein the human interface logic is operable to decode the encoded audio signals from a format suitable for transmission from the remote location;

wherein the audio logic receives the decoded audio signals from the human interface logic; and wherein the decoded human interface signals include the decoded audio signals.

27. The computing system of claim 16, further comprising network interface logic comprised on the printed circuit board for interfacing to a network, wherein the network interface logic is operable to receive encoded network signals from the network and decode the encoded network signals.

28. The computing system of claim 16, further comprising a power supply comprised on the frame, wherein the power supply is operable to couple to an external power source and supply power to the computing system.

29. The computing system of claim 16, further comprising:

a cage having a plurality of slots, wherein the computer card is configured to be inserted into a slot of the cage, wherein the cage includes a cage connector which is configured to couple to the human interface connector on the computer card, wherein the cage connector also includes an external second connector electrically coupled to the cage connector, wherein the external second connector is configured for coupling to the one or more cables for reception of the encoded one or more human interface signals from the remote location.

30. A computing system, comprising: a computer card, wherein the computer card comprises: a frame;

a printed circuit board mounted to the frame;

a CPU comprised on the printed circuit board;

a memory comprised on the printed circuit board;

a non-volatile memory comprised on the frame;

human interface logic comprised on the printed circuit board which is operable to perform one or more of: 1) receiving one or more outgoing human interface signals and encoding the one or more outgoing human interface signals into a format suitable for transmission to a remote location or 2) receiving one or more incoming encoded human interface signals from the remote location and decoding the one or more incoming human interface signals into a format suitable for transmission to logic on the computing system;

a human interface connector coupled to the human interface logic, wherein the human interface connector is configured to couple to one or more cables for communication of one or more of outgoing or incoming encoded human interface signals with the remote location; and a power supply comprised on the frame, wherein the power supply is operable to couple to an external power source and supply power to the computing system;

wherein the computer card is dedicated to a specific human interface, and wherein the non-volatile memory on the frame is dedicated to a plurality of files used by a user of the specific human interface for which the computer card is dedicated.

31. The computing of claim 30, wherein the remote location is more than 20 feet from the computing system.

32. A system comprising a plurality of computing systems, the system comprising:

a cage having a plurality of slots, wherein each of the slots is configured to receive a computer card;

wherein each computer card comprises:
a frame;
a printed circuit board mounted to the frame;
a CPU comprised on the printed circuit board;
a memory comprised on the printed circuit board;
a non-volatile memory comprised on the frame;
human interface logic comprised on the printed circuit board which is operable to receive two or more human interface signals and encode the two or more human interface signals into a format suitable for transmission to a remote location;

a human interface connector coupled to the human interface logic, wherein the human interface connector is configured to couple to one or more cables for transmission of the encoded two or more human interface signals to the remote location; and a power supply comprised on the frame, wherein the power supply is operable to couple to an external power source and supply power to the computing system;

wherein each computer card is dedicated to a specific human interface, and wherein the non-volatile memory on the frame of each computer card is dedicated to a plurality of files used by a user of the specific human interface for which the computer card is dedicated.

33. The system of claim 32, wherein each computer card further comprises network interface logic comprised on the printed circuit board for interfacing to a network.

34. The system of claim 32,
wherein each of the computer cards further includes one or more of video interface logic, keyboard interface logic, and pointing device logic for generating video signals, keyboard signals, and pointing device signals, respectively; and
wherein the one or more of the video interface logic, keyboard interface logic, and pointing device logic are each configured to couple to the human interface logic;
wherein the human interface logic is operable to receive one or more of the video signals, the keyboard signals, and the pointing device signals, and encode the signals into a format suitable for transmission to the remote location; and
wherein the encoded one or more of the video signals, the keyboard signals, and the pointing device signals, are comprised in the encoded human interface signals.

35. The system of claim 32,
wherein each of the computer cards further includes one or more of audio interface logic and USB interface logic, for generating audio signals and USB signals, respectively;
wherein the one or more of the audio interface logic and the USB interface logic are each configured to couple to the human interface logic;
wherein the human interface logic is operable to receive the one or more of the audio signals and the USB signals and encode the one or more of the audio signals and the USB signals into a format suitable for transmission to the remote location; and
wherein the encoded one or more of the audio signals and the USB signals are comprised in the encoded human interface signals.

36. The system of claim 32,
wherein each of the computer cards further includes three or more of video interface logic, keyboard interface logic, pointing device logic, audio interface logic, and USB interface logic, for generating video signals, keyboard signals, pointing device signals, audio signals, and USB signals respectively; and
wherein the three or more of the video interface logic, keyboard interface logic, pointing device logic, audio interface logic, and USB interface logic are each configured to couple to the human interface logic;
wherein the human interface logic is operable to receive the three or more of the video signals, keyboard signals, pointing device signals, audio signals, and USB signals, and encode the signals into a format suitable for transmission to the remote location; and
wherein the encoded three or more of the video signals, keyboard signals, pointing device signals, audio signals, and USB signals, are comprised in the encoded human interface signals.

37. The system of claim 32,
wherein the cage further comprises a cage connector which is configured to couple to the human interface connector on each of the computer cards, wherein the cage connector also includes an external second connector configured for coupling to the one or more cables for transmission of the encoded human interface signals to the remote location.

38. The system of claim 37,
wherein the cage connector is further configured to couple to the network interface logic on each of the computer cards, wherein the external second connector is also configured for coupling to one or more network cables for coupling each of the computer cards to the network.

39. The system of claim 37,
wherein each of the computer cards further includes one or more of video interface logic for generating video signals, keyboard interface logic for generating keyboard signals, and pointing device interface logic for generating pointing device signals; and
wherein the cage connector is further configured to couple to the one or more of the video interface logic, the keyboard interface logic, and the pointing device interface logic on each of the computer cards, wherein the external second connector is also configured for coupling to the one or more cables for transmission of the one or more of the video signals, the keyboard signals, and the pointing device signals, to the remote location.

40. The system of claim 37,
wherein each of the computer cards further includes one or more of audio interface logic for generating audio signals and USB interface logic for generating USB signals; and
wherein the cage connector is further configured to couple to the one or more of the audio interface logic and the USB interface logic on each of the computer cards, wherein the external second connector is also configured for coupling to the one or more cables for transmission of the one or more of the audio signals and the USB signals to the remote location.

41. The system of claim 32,
wherein the human interface logic is operable to encode the one or more human interface signals into a format suitable for transmission of a distance greater than 20 feet to the remote location.

42. A system comprising a plurality of computing systems, the system comprising:
a cage having a plurality of slots, wherein each of the slots is configured to receive a computer card;
wherein each computer card comprises:
a frame;
a printed circuit board mounted to the frame;
a CPU comprised on the printed circuit board;
a memory comprised on the printed circuit board;
a non-volatile memory comprised on the frame;
human interface logic comprised on the printed circuit board which is operable to receive two or more encoded human interface signals from a remote location and decode the two or more human interface signals from a format suitable for transmission from the remote location;
a human interface connector coupled to the human interface logic, wherein the human interface connector is configured to couple to one or more cables for reception of the encoded two or more human interface signals from the remote location;
a power supply comprised on the frame, wherein the power supply is operable to couple to an external power source and supply power to the computing system;
wherein the decoded human interface signals are useable by the computer card;
wherein each computer card is dedicated to a specific human interface, and wherein the non-volatile memory on the frame of each computer card is dedicated to a plurality of files used by a user of the specific human interface for which the computer card is dedicated.

43. The system of claim 42, wherein each computer card further comprises network interface logic comprised on the printed circuit board for interfacing to a network.

44. The system of claim 42,
wherein each of the computer cards further includes one or more of video interface logic, keyboard interface logic, and pointing device logic for receiving encoded video signals, encoded keyboard signals, and encoded pointing device signals, respectively;
wherein the one or more of the video interface logic, keyboard interface logic, and pointing device logic are each configured to couple to the human interface logic;
wherein the human interface logic is operable to receive one or more of the encoded video signals, the encoded keyboard signals, and the encoded pointing device signals from the remote location and decode the one or more of the encoded video signals, the encoded keyboard signals, and the encoded pointing device signals from a format suitable for transmission from the remote location; and
wherein the one or more of the encoded video signals, the encoded keyboard signals, and the encoded pointing device signals are comprised in the encoded human interface signals.

45. The system of claim 42,
wherein each of the computer cards further includes one or more of audio interface logic and USB interface logic for receiving encoded audio signals and encoded USB signals, respectively;
wherein the one or more of the audio interface logic and USB interface logic are each configured to couple to the human interface logic;
wherein the human interface logic is operable to receive one or more of the encoded audio signals and the encoded USB signals from the remote location and decode the one or more of the encoded audio signals and the encoded USB signals from a format suitable for transmission from the remote location; and
wherein the one or more of the encoded audio signals and the encoded USB signals are comprised in the encoded human interface signals.

46. The system of claim 42,
wherein each of the computer cards further includes three or more of video interface logic, keyboard interface logic, pointing device logic, audio interface logic, and USB interface logic, for receiving encoded video signals, encoded keyboard signals, encoded pointing device signals, encoded audio signals, and encoded USB signals respectively; and
wherein the three or more of the video interface logic, keyboard interface logic, pointing device logic, audio interface logic, and USB interface logic are each configured to couple to the human interface logic;
wherein the human interface logic is operable to receive the three or more of the encoded video signals, the encoded keyboard signals, the encoded pointing device signals, the encoded audio signals, and the encoded USB signals, and decode the signals from a format suitable for transmission from the remote location; and
wherein the three or more of the encoded video signals, the encoded keyboard signals, the encoded pointing device signals, the encoded audio signals, and the encoded USB signals, are comprised in the encoded human interface signals.

47. The system of claim 42,
wherein the cage further comprises a cage connector which is configured to couple to the human interface connector on each of the computer cards, wherein the cage connector also includes an external second connector configured for coupling to the one or more cables for reception of encoded human interface signals from a remote location.

48. The system of claim 47,
wherein the cage connector is further configured to couple to the network interface logic on each of the computer cards, wherein the external second connector is also configured for coupling to one or more network cables for coupling each of the computer cards to the network.

49. The system of claim 47,
wherein each of the computer cards further includes one or more of video interface logic for receiving video signals, keyboard interface logic for receiving keyboard signals, and pointing device interface logic for receiving pointing device signals; and
wherein the cage connector is further configured to couple to the one or more of the video interface logic, the keyboard interface logic, and the pointing device interface logic on each of the computer cards, wherein the external second connector is also configured for coupling to the one or more cables for reception of the one or more of the video signals, the keyboard signals, and the pointing device signals from the remote location.

50. The system of claim 47,
wherein each of the computer cards further includes one or more of audio interface logic for receiving audio signals and USB interface logic for receiving USB signals; and
wherein the cage connector is further configured to couple to the one or more of the audio interface logic and the USB interface logic on each of the computer cards, wherein the external second connector is also configured for coupling to the one or more cables for reception of the one or more of the audio signals and the USB signals to the remote location.

51. The system of claim 42,
wherein the human interface logic is operable to encode the one or more human interface signals into a format suitable for transmission of a distance greater than 20 feet to the remote location.

52. A system comprising a plurality of computing systems and corresponding human interfaces, the system comprising:
a cage having a plurality of slots, wherein each of the slots is configured to receive a computer card;
wherein each computer card comprises:
a frame;
a printed circuit board mounted to the frame;
a CPU comprised on the printed circuit board;
a memory comprised on the printed circuit board;
a non-volatile memory comprised on the frame;
human interface logic comprised on the printed circuit board which is operable to perform one or more of:
1) receiving one or more outgoing human interface signals and encoding the one or more outgoing human interface signals into a format suitable for transmission to a remote location, or 2) receiving one or more incoming encoded human interface signals from the remote location and decoding the one or more incoming human interface signals into a format suitable for transmission to logic on the computing system;
a human interface connector coupled to the human interface logic, wherein the human interface connec tor is configured to couple to one or more cables for communication of the one or more of outgoing or incoming encoded human interface signals with the remote location; and a power supply comprised on the frame, wherein the power supply is operable to couple to an external power source and supply power to the computing system;

a plurality of human interfaces each located at a location remote from the cage, wherein each of the human interfaces includes a display device and at least one user input device; and at least one cable coupled between each computer card and a corresponding one of the human interfaces, wherein each at least one cable is operable to communicate the one or more outgoing or incoming encoded human interface signals with the corresponding human interface;

wherein each computer card is dedicated to a specific human interface, and wherein the non-volatile memory on the frame of each computer card is dedicated to a plurality of files used by a user of the specific human interface for which the computer card is dedicated.

53. The system of claim 52,
wherein the remote location is further than 20 feet from the cage.

54. The system of claim 52,
wherein the cage further comprises a cage connector which is configured to couple to the human interface connector on each of the computer cards, wherein the cage connector also includes an external second connector configured for coupling to each of the one or more cables for communication of the one or more encoded outgoing or incoming human interface signals with the corresponding human interface.

55. The system of claim 52,
wherein each computer card further comprises network interface logic comprised on the printed circuit board for interfacing to a network; and wherein the cage further comprises a cage connector which is configured to couple to the network interface logic on each of the computer cards, wherein the cage connector also includes an external second connector configured for coupling to one or more network cables for coupling each of the computer cards to the network.

* * * * *